United States Patent [19]

Gallmeyer

[11] Patent Number: 4,882,565
[45] Date of Patent: Nov. 21, 1989

[54] INFORMATION DISPLAY FOR REARVIEW MIRRORS

[75] Inventor: William W. Gallmeyer, Holland, Mich.

[73] Assignee: Donnelly Corporation, Holland, Mich.

[21] Appl. No.: 163,387

[22] Filed: Mar. 2, 1988

[51] Int. Cl.⁴ .............................................. B60Q 9/00
[52] U.S. Cl. ..................................... 340/461; 350/600; 362/83.1
[58] Field of Search ........................ 340/98, 107, 52 F; 350/600, 601, 606; 40/219, 900; 362/142, 135, 61, 83.1; 342/459, 461

[56] References Cited

U.S. PATENT DOCUMENTS

| | | |
|---|---|---|
| Re. 32,576 | 1/1988 | Pastore .................................. 350/600 |
| D. 289,989 | 5/1987 | Skogler et al. . |
| 809,698 | 1/1906 | Kelley .................................. 350/600 |
| 1,528,082 | 3/1925 | Schlaich . |
| 1,849,708 | 3/1932 | Colbert et al. . |
| 1,884,759 | 10/1932 | La Hodny . |
| 1,908,767 | 5/1933 | La Hodny . |
| 2,166,303 | 7/1939 | La Hodny et al. . |
| 2,561,582 | 7/1951 | Marbel . |
| 3,317,906 | 5/1967 | Baldridge . |
| 3,574,283 | 4/1971 | Albers . |
| 4,109,235 | 8/1978 | Bouthors ........................... 340/52 F |
| 4,167,113 | 9/1979 | Mann . |
| 4,274,078 | 6/1981 | Isobe et al. . |
| 4,475,100 | 10/1984 | Duh . |
| 4,499,451 | 2/1985 | Suzuki et al. .......................... 340/98 |
| 4,630,904 | 12/1986 | Pastore ................................. 350/600 |
| 4,645,970 | 2/1987 | Murphy ............................... 313/509 |
| 4,646,210 | 2/1987 | Skogler et al. ...................... 362/142 |
| 4,663,869 | 5/1987 | Nakagawa ............................ 40/219 |
| 4,733,336 | 3/1988 | Skogler et al. ...................... 362/142 |

FOREIGN PATENT DOCUMENTS 2359285  5/1974  Fed. Rep. of Germany ........ 340/98

OTHER PUBLICATIONS

Blazer 5000—The Mark Of A Leader, Lasertechnics, Albuquerque, New Mexico, published 1985.
Comet—Fast, Permanent and Affordable Laser Marking, Quantrad, A Lasertechnics Subsidiary, Torrance, California, published 1982.
Automated Laser Product Marking, Quantrad, A Lasertechnics Subsidiary, Torrance, California, published 1985.
Discover Why Major Manufacturers are Choosing Inkless Lasertechnics Markers For Reliable, Cost—Efficient Product Coding, Lasertechnics, Albuquerque, NM, published 1985.

Primary Examiner—Joseph A. Orsino
Assistant Examiner—Brian R. Tumm
Attorney, Agent, or Firm—Price, Heneveld, Cooper, DeWitt & Litton

[57] ABSTRACT

A rearview mirror assembly for vehicles which displays information useful to the driver/viewer when viewing the mirror assembly. Indicia are formed by narrow deletion lines, preferably using computer controlled laser marking apparatus, in a reflective coating on a mirror element of the assembly. A light source, which may be a light emitting diode, an incandescent bulb or another type source, is positioned behind the mirror element to illuminate the indicia for distinct, clear, precise visibility by the driver/viewer. The lines of the deletion area are sufficiently narrow as to be generally unnoticeable to the unaided viewer's eyes when a rear vision image is reflected by the reflecting surface and the light source is unlit thereby preventing interference with normal driving use of the mirror assembly. The light source may be used to simultaneously illuminate portions of the vehicle as well as the deletion area indicia.

37 Claims, 2 Drawing Sheets

INFORMATION DISPLAY FOR REARVIEW MIRRORS

BACKGROUND OF THE INVENTION

This invention relates to vehicular rearview mirrors and, more particularly, to vehicle mirrors incorporating apparatus to provide an information display for viewing by the vehicle driver or passengers in conjunction with viewing the rearview mirror.

In recent years, rearview mirrors for vehicles, especially those mounted inside vehicles, have included courtesy, reading or map lights, compasses, headlight dimming sensors and other instruments or controls. It has also been proposed to provide information to the driver of the vehicle by mounting warning or indicator lights, gauges, instrument readouts or the like above, around or near the rearview mirror such that the vehicle driver can view such information while looking in the direction of the rearview mirror. This enhances safety by diverting the driver's attention away from the road less frequently.

Some prior known assemblies have included warning or indicator lights mounted in the rearview mirror case around the periphery of the mirror itself. See for example Bouthors U.S. Pat. No. 4,109,235 which discloses various signal lamps and symbols above the mirrored surface and various readouts for other information below the mirrored surface, both being mounted in a specially designed mirror case. Such assemblies are expensive to manufacture because they require unique, completely redesigned mirror cases which incorporate the lights, indicators and other signaling apparatus. They also greatly enlarge the size of the mirror assembly thereby taking up a greater proportion of the forward viewing area adjacent the windshield.

Other rearview mirror assemblies are known which include warning lights or liquid crystal displays positioned directly in the mirrored surface. For example, Pastore U.S. Pat. No. 4,588,267 discloses a combination rearview mirror and clock or instrument display wherein a large circle or rectangle of the mirrored surface is removed and an instrument such as a clock, fuel gauge or warning light is positioned behind the removed area for readout through that area from the front of the mirror. When warning lights are used, relatively large sized circles are used with printed words indicating the nature of the warning placed directly on the front surface of the mirror such as "battery", "oil", or "seat belt". Such assemblies are also large and typically require redesigned rearview mirror cases. More importantly, however, the information displays provided are highly noticeable at all times on the mirror surface and are large enough to interfere with proper viewing of images in the mirror from the rear of the vehicle. Likewise, those areas in such mirrors using liquid crystal displays lack brightness and color for distinguishing different types of symbols, and are still so large that they were noticeable even when unlit to drivers when viewing the mirror surface. Therefore, these assemblies tend to interfere with proper viewing in the mirror and are less desirable from a safety standpoint.

Yet another type of information mirror provides an electroluminescent display behind a translucent or "one way" mirror coating on an interior vehicular rearview mirror. For example, Suzuki et al. U.S. Pat. No. 4,499,451 discloses a glass substrate having a second surface, thin, translucent reflective layer which reflect only a part of the light incident thereon while allowing the remainder to pass therethrough. A planar electroluminescent electrode is printed or applied to the rear surface of the translucent layer and is formed either in the shape of indicia or covered with an electrode shaped in the form of indicia. When voltage is applied, the electroluminescent layer lit up in the shape of the electrode to provide information visible through the translucent layer from the front of the mirror. While remaining inconspicuous when voltage is switched off, this assembly does require significantly large size indicia relative to the size of the mirrored surface such that proper viewing through the light inhibiting layer can be made. Such large size indicia dominate the mirrored surface when activated such that interference with vision of images in the rearview mirror to the rear of the vehicle occurs. In addition, significant control circuitry is necessary for the electroluminescent electrode including a transformer connected with the direct current vehicle electrical system.

Accordingly, the prior known information mirrors left unsolved the need for an appropriate information display which would be unnoticeable to the driver and avoid obstruction of rear vision when unlit or unactivated, be less expensive, be suitable for mass production, allow accurate, small sized indicia, and yet allow sufficient brightness and clarity to be easily visible and readable by the vehicle driver or passengers when lit or activated.

SUMMARY OF THE INVENTION

Accordingly, the present invention provides a rearview mirror assembly for vehicles which provides information directly on the reflective surface of the mirror when lit or activated but remains generally unnoticeable to the driver or viewer using the mirror for rear vision images when unlit or not activated. Information is provided by means of narrow deletion lines forming desired indicia in the reflective surface. The deletion area is backlit by a suitable light source of one of several varieties which may be controlled, switched or filtered to provide necessary information in various colors.

In one form, the invention is an improved rearview mirror assembly for vehicles of the type including a mirror element having a reflective surface thereon and information means for providing information to the viewer of the mirror. The improvement includes a narrow deletion area in the reflective surface in which the reflective surface is removed to form an opening of predetermined shape such as a symbol, word or other indicia. Light source means are positioned behind the reflective surface on the side of the mirror element opposite that from which the mirror element will be viewed in a vehicle for illuminating the deletion area when lit or activated. The deletion area is sufficiently narrow as to be generally unnoticeable to the unaided eye of the viewer of the mirror element when viewing a rear vision image reflected by the reflective surface and the light source is unlit or unactivated. However, the deletion area provides a highly distinct, clear, and precise lighted indicia visible to the mirror viewer when the light source is activated.

Preferably, the mirror element is transparent with a first surface adapted to face the vehicle interior and a second surface opposite the first and including a reflective coating thereon. The deletion area includes a narrow opening in that reflective coating. Also each deletion area preferably includes a plurality of ultra-narrow deletion lines, the lines forming at least one symbol, word or other indicia A number of deletion areas may be grouped together adjacent one another in an area of the reflective coating adjacent an edge of the mirror to minimize interference with rear vision images. In the preferred embodiment, each deletion line is less than or equal to 0.005 inches and is formed by programmable, YAG laser marking apparatus.

Various types of lights may be used behind the deletion areas. A single incandescent light source may be provided to simultaneously illuminate other parts of the vehicle from the rearview mirror assembly in addition to the deletion area. Such a light source includes a light holder having a first light aperture opening downwardly and outwardly of the case to provide a map, courtesy or reading light and a second light aperture aligned with a symbol, word or other indicia on the reflective surface of the mirror to illuminate the symbol, word or other indicia when activated.

Alternately, or together with the incandescent light source, a housing is adhered to the back of the reflective element and includes at least one light emitting diode. A separate diode may be provided for each separate symbol which may comprise individual warning signals for various vehicle functions and components such as seat belt fastening, engine oil level, fuel level and engine coolant temperature.

In addition, thin light filtering material sheets and/or diffuser sheets may be positioned between the lights and the deletion areas to provide desired colors and brightness for each separate deletion area.

Accordingly, the invention provides a unique rearview mirror assembly in which information is provided clearly and accurately within the boundaries of the rear vision element without requiring specially designed or enlarged mirror cases or enlarged mirror assemblies. This preserves the maximum forward viewing area. When the information display is unlit, the deletion lines are sufficiently small and narrow to be generally unnoticeable to the unaided eye of the driver or viewer using the mirror. Thus, the information symbols, words or other indicia do not interfere with viewing of rear vision images because the eyes of the viewer or driver are focused on the focal plane of the images from the rear, and not that of the reflective surface of the mirror. In addition, the invention is sufficiently durable to provide information on both inside and outside rearview mirrors, is adaptable for use in various colors, while remaining sufficiently bright, clear and distinct to be easily visible by all viewers and drivers. Further, the invention provides an information display on rearview mirrors which is less expensive, more accurate and easily mass produced, and enables smaller, less obtrusive, yet more highly defined indicia than previously were attainable with prior known methods.

These and other objects, advantages, purposes and features of the invention will become more apparent from a study of the following description taken in conjunction with the drawings.

DESCRIPTION OF THE PREFERRED EMBODIMENTS

Figure 1:
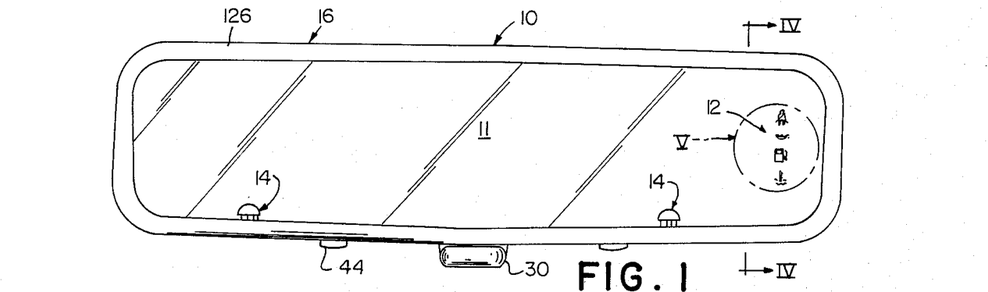
FIG. 1 is a front elevation of a rearview mirror assembly including the information display of the present invention.
Figure 2:
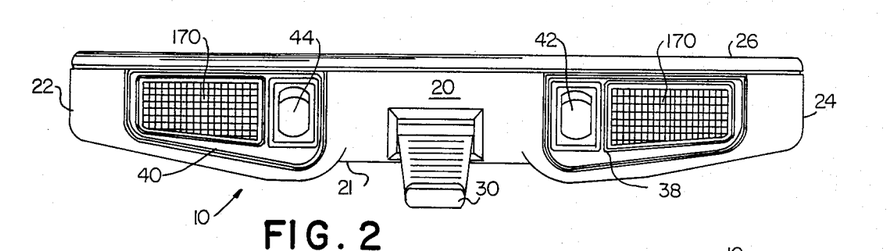
FIG. 2 is a bottom plan view of the information display rearview mirror assembly of FIG. 1.
Figures 3, 4, 5:
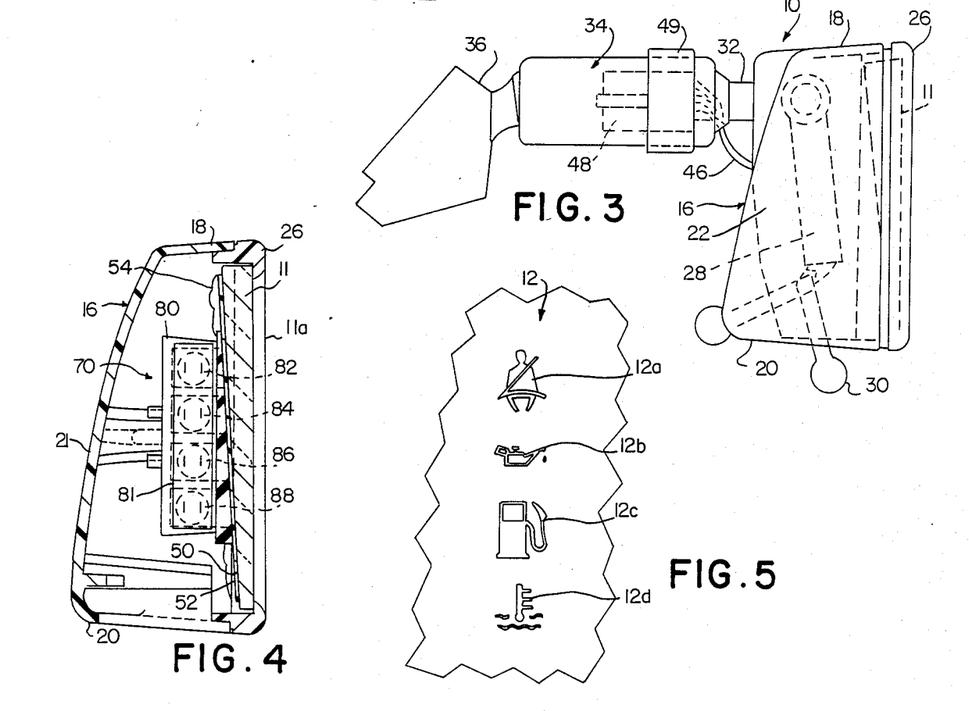
FIG. 3 is a side elevation of the information display rearview mirror assembly of FIGS. 1 and 2 illustrating a typical adjustable mounting apparatus for the mirror assembly.
FIG. 4 is, a sectional side elevation of the assembly taken along plane IV—IV of FIG. 1.
FIG. 5 is a fragmentary enlarged view of the information display deletion lines in area V of FIG. 1.

Referring now to the drawings in greater detail, FIGS. 1-3 illustrate an interior rearview mirror assembly 10 incorporating two information displays of the present invention. Rearview mirror assembly 10 is of the adjustable day/night variety in which transparent glass prismatic mirror element 11 and mirror case 16 are pivoted together between a high reflectivity day viewing position in which 80% to 90% of the light is reflected from reflective coating 50 to the eye of the driver and a low reflectivity night position in which approximately only 4% of the incident light from the uncoated front surface 11a of the prism is reflected. The night position prevents glare from obstructing the driver's vision. In the mirror assembly 10, however, information displays 12 and 14 are included to provide various information on the operation of the vehicle, and/or its safety equipment, and/or surrounding environmental conditions to the driver or other viewers in the passenger compartment when the driver or such other viewers look at the rearview mirror assembly. Information displays 12, 14 are provided near the edges of the reflecting area of mirror element 11 to avoid possible interference with rear vision images. Area 12 provides engine and vehicle safety equipment warning information near the right edge of the reflective area, while courtesy/map light activation information is provided near the bottom edge of the reflective area.

Rearview mirror assembly 10 is of the type including light assemblies for providing courtesy/map lighting to the interior of the vehicle as described in co-pending, commonly assigned U.S. patent application Ser. No. 879,158, filed June 26, 1986, entitled LIGHTED/INFORMATION CASE ASSEMBLY FOR REARVIEW MIRRORS, invented by Brian I. Skogler, Kenneth Schofield, William P. Lantz, Eldon J. Nyhof, Dorothy J. Helder and Charles Max Flowerday, now U.S. Pat. No. 4,733,336, the disclosure of which is hereby incorporated by reference. Assembly 10 includes a molded, thermoplastic mirror case 16 including a top wall 18, bottom wall 20, back wall 21, end walls 22, 24 and either a preformed peripheral edge or lip into which the prismatic day/night rearview mirror element is snapped after assembly of the mechanisms within the case or a separately formed thermoplastic bezel 26 which may be placed over the mirror element 11 and adhered in place. A molded day/night actuator 28 is pivotally mounted within the case and includes an integral pivot lever or tab 30 molded in one piece with the actuator and extending from bottom wall 20 for pivoting mirror element 11 and case 16 together to bring the nonparallel surfaces of the prismatic mirror element 11 into alignment with the driver's vision to provide the high and low reflectivity described above. A ball member 32 extends rearwardly from the case assembly for attachment to a spring biased, double ball joint mounting assembly 34 which includes a conventional cast metal channel mount 36 to be fitted on a windshield mounted support (not shown) adhered to the inside surface of a vehicle windshield.

Mirror assembly 10 also includes a pair of carrier modules 38, 40 positioned symmetrically on either side of day/night actuator tab 30 on bottom wall 20 of case 16. As will be more fully explained below in connection with FIGS. 8-10, each carrier module includes a light support housing holding an incandescent bulb 154 which provides light directed downwardly and outwardly of each end of the mirror assembly through lens 170. These lights are controlled separately by toggle switches 42, 44. As explained in U.S. Pat. No. 4,733,336 referenced above, bottom wall 20 of case 16 slants upwardly away from the driver or viewer of the mirror when positioned within the vehicle passenger compartment such that the only portion of the carrier module/light assembly which is visible from the front is a slight portion of the toggle switches 42, 44 as is evident from FIG. 1. As shown in FIG. 3, electrical power is provided to the light assemblies within mirror assembly 10 via wiring 46 leading to a plug connector 48 retained on adjustable mounting tube 34 by a molded plastic clip 49.

Figure 6:
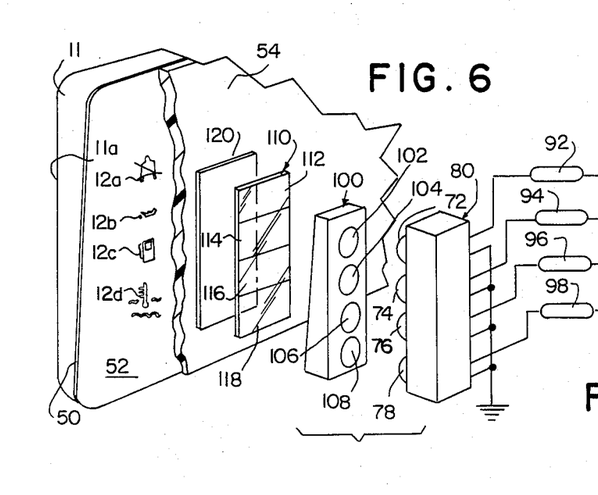
FIG. 6 is a fragmentary, exploded, perspective view of one form of the information display assembly shown in FIG. 4.
Figure 10:
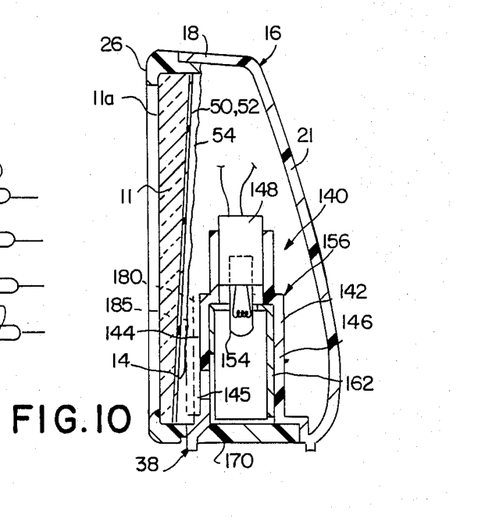
FIG. 10 is a sectional side elevation of the carrier module and light housing assembly mounted in the rearview mirror case taken along plane X—X of FIG. 9.

Referring now to FIGS. 4-6, the details of the engine and vehicle safety equipment warning symbol information display 12 will be understood. As shown in FIGS. 4 and 6, prismatic mirror element 11 includes a uniform reflective coating 50 over its entire rear surface preferably including a combination of metallic elements such as silver and copper or a single metallic element such as aluminum to provide highly spectral reflection of approximately 80% to 90% of the incident light thereon. For protection, reflective coating 50 is covered with a layer of paint 52 followed by a shatterproofing, anti-scatter layer 54 which prevents pieces or fragments of mirror element 11 from scattering throughout the vehicle in the event of impact and breakage during an accident. Such layer may be any of a number of conventional plastisol type thermoplastic layers which adhere firmly to the rear surface of the coated mirror element 11 but retain a resilient, rubber-like consistency. As shown in FIGS. 6 and 10, anti-scatter layer 54 is deleted or removed from protective paint layer 52 over reflective coating 50 in the area of the group of engine and vehicle safety warning symbols 12 as well as in the area of the courtesy/map light activation symbols 14 described above. Such removal provides access to the deletion areas or symbols formed in the painted, reflective layers 50, 52 on the rear surface of mirror element 11 which have been previously marked on the mirror element as explained below.

Figure 7:
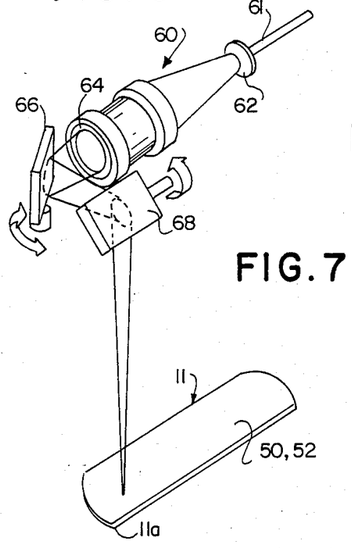
FIG. 7 is a schematic perspective view of the YAG programmable laser marking apparatus illustrating a laser marking beam directed at the reflective coating on a rearview mirror element.

Preferably, indicia or symbols 12, 14 are formed using a programmable, computer controlled laser marking apparatus such as that shown schematically in FIG. 7 and available under the trademark "COMET" from Quantrad of Torrance, California, U.S.A., a subsidiary of Lasertechnics of Albuquerque, N.M. A preferred laser marking apparatus is a computer controlled, 70 watt, water-cooled, Q switched Nd:YAG noncontact laser marking device which emits a marking laser of 1.064 micron wavelength light which can be controlled to extremely small sizes and narrow widths. As in FIG. 7, laser marking apparatus 60 preferably includes a YAG laser beam 61 which passes through a negative lens 62 to a positive lens 64. The focused beam 61 is then directed by an adjustable X axis galvanometer mirror 66 to an adjustable Y axis galvanometer mirror such that the laser marking beam is directionally controlled to form the desired indicia or symbols on the rear surface of the mirror element 11. Mirror 66 is rotatable about the X axis while mirror 68 is rotatable about the Y axis as shown by the arrows in FIG. 7. The mirrors are directionally controlled by a programmable computer. The system can be programmed to engrave, form a dot matrix or form thicker lines with a "wobble" mode. Preferably, however, the YAG laser 60 is focused to remove the reflective coating and paint layer 50, 52 without marking the rear surface of glass element 11 thereby forming deletion lines of 0.005 inches or less in width. These lines are formed in a defined shape or design to provide symbols, words or other indicia in the reflective coating and paint layer 50, 52 in the desired area on the rear of the mirror element. As will be understood from FIG. 5, laser marking apparatus 60 may be programmed to form precise, accurately defined and highly distinct symbols such as those in area 12 including a seat belt fastening warning symbol 12a, a low engine oil level warning symbol 12b, a low fuel level warning symbol 12c, and a high engine coolant temperature warning symbol 12d. Each symbol 12a-12d is comprised of a plurality of ultra-narrow deletion lines which are cut or burned by the laser apparatus 60 into the defined shape to provide openings through the reflective coating and paint layer in an outline of each symbol or indicia. Alternately, appropriate warning words or any of a number of other type symbols could be formed in the reflective layer on the rear of the mirror element. Further, a series of numeral indicia also could be formed in the reflective surface and individually lit by light sources to provide atmospheric temperature information, interior vehicle temperature information or other information as desired.

As shown in FIGS. 1, 5 and 6, symbols 12a-12d are grouped near one another in a vertical arrangement adjacent the right hand edge of mirror element 11 in the mirror assembly 10. Such positioning of the symbols leaves substantially the entire extent of the reflective surface of mirror element 11 free for unobstructed rear vision by the driver. In addition, the ultra-narrow deletion lines of symbols 12a-12d are sufficiently narrow as to be generally unnoticeable to the unaided eye of the driver or viewer when unlit from behind. In general, and at all times when unlit, the lines are not noticeable because there is little contrast between the reflective surface and the indicia. However, lighting of the indicia increases contrast between the reflective surface and the indicia. Apparent size also increases due to light diffraction.

Also, when a driver focuses his eyes on the distant images in the mirror surface, the lines in the mirror will be unresolvable due to the limited depth of field of the eyes. The binocular driver will sample two separate areas of the mirror, each with one eye, when viewing a distant image. Thus, at most, only one eye could view the deletion line area and when viewing the distant image, it is unlikely that either eye would focus on the deletion lines, especially in view of the limited depth of field of the human eye and the narrow extent of the lines.

As shown in FIGS. 4 and 6, backlighting of indicia or symbols 12a-12d from behind the mirror element 11 is provided by one of several different types of light sources. Preferably, symbols 12a-12d are backlit by a light assembly 70 including separate, individual light emitting diodes 72, 74, 76 and 78 fitted within a molded resinous diode housing 80 receiving a molded, thermoplastic diode mounting block 81 from one side. Block 81 has four forward facing openings adapted to receive the diodes 72, 74, 76, 78 which protrude from the front surface thereof. Electrical leads from the diodes extend laterally from openings 82, 84, 86 and 88 in the side of block 81. As shown in FIG. 6, each diode is connected to ground and through separate resistors 92, 94, 96, 98 to individual sensors either on the engine or other parts of the vehicle such as its safety equipment, e.g., seat belts. In the preferred embodiment, in a 12 volt direct current automotive electrical system, each resistor 92, 94, 96, 98 has a value of 560 ohms, ¼ watt. The ground connection from each diode is connected to the appropriate ground wire in the electrical wiring harness 151 already provided within the lighted rearview mirror assembly 10 as described above (FIG. 9). Thus, when a signal is sensed from the appropriate engine or safety apparatus equipment in the vehicle, electrical current is provided through the diode wiring and the appropriate resistor 92-98 to activate the appropriate light emitting diode 72-78 to provide light behind the appropriate symbol 12a-12d which will then be visible to the driver or mirror viewer and indicate a warning that appropriate action should be taken.

Diode housing 80 with diode block 81 is preferably mounted directly to the rear surface of mirror element 11 over the reflective and painted coating 50, 52 such that diodes 72-78 are aligned and in registry with symbols 12a-12d. Mounting is accomplished using a wedge-shaped spacer pad or cushion 100 of flexible, resilient, rubber-like material such as a closed-cell polyurethane. Mounting pad 100 includes four apertures 102, 104, 106, 108 sized to receive the free ends of each of the protruding light emitting diodes 72-78 as indicated in FIG. 6. Pad 100 spaces housing 80 away from mirror element 11 to provide room for the protruding diodes. Diode housing 80 is adhered directly to the rear surface of pad 100 in the areas surrounding apertures 102-108.

The front surface of pad 100 is secured to a light filter 110 preferably comprising a thin, transparent sheet of polyethylene material having a preferred thickness of 0.002 to 0.003 inches (two to three mils). Light filter 110 may include a separate transparent, colored section for each of the light emitting diodes in housing 80. For instance, section 112 may be left transparent such that unfiltered, white or pale yellow light from diode 72 passing through aperture 102 will be directly visible through symbol 12a. Section 114, 116 and 118 may be printed with transparent ink of any desired color such as red or green such that light from diodes 74-78 will be filtered with light wavelengths in the color regions other than the desired color being absorbed to provide red, green or other desired light visible through symbols 12b, 12c and 12d. As such, light filter 110 may be colored with appropriate transparent inks such as green, yellow, amber or the like to provide any desired color for the indicia being lighted by the individual light emitting diode in alignment therewith. As with housing 80, filter 110 is adhered to the front surface of pad 100 with an appropriate adhesive in the areas surrounding apertures 102-108. The entire assembly of diode housing 80, block 81, pad 100 and light filter 110 may be adhered directly over the vertically aligned symbols 12a-12d using a double sided, transparent adhesive tape 120. Tape 120 helps to seal off any exposed edges of metallic reflective coating 50 along the deletion lines from the atmosphere help to prevent any possible reaction or corrosion which could possibly degrade the reflective coating in those areas.

Accordingly, when the individual light emitting diodes 72-78 are activated by their respective engine or safety apparatus sensors, bright, white or colored light will be generated to illuminate symbols 12a-12d and provide bright, well-defined, accurate, warning signals of high visibility and clarity to the driver or viewer viewing the mirror assembly 10 from the front side. When unlit, however, those symbols 12a-12d remain sufficiently faint because of the narrow deletion lines from which they are formed as to be generally unnoticeable to the driver or viewer.

As will now also be apparent, different colors for the different indicia or symbols formed in the reflective coating 50, 52 may be provided using different colored light emitting diodes 72-78 or different colored incandescent lights in place of the diodes. Use of light emitting diodes is advantageous, however, because of the level of light produced with low temperatures. High temperatures could otherwise damage housing 80, block 81, pad 100 or light filter 110 or the surrounding portions of the mirror case. As is apparent, however, various types of light sources may be used within the scope of this invention.

Figure 8:
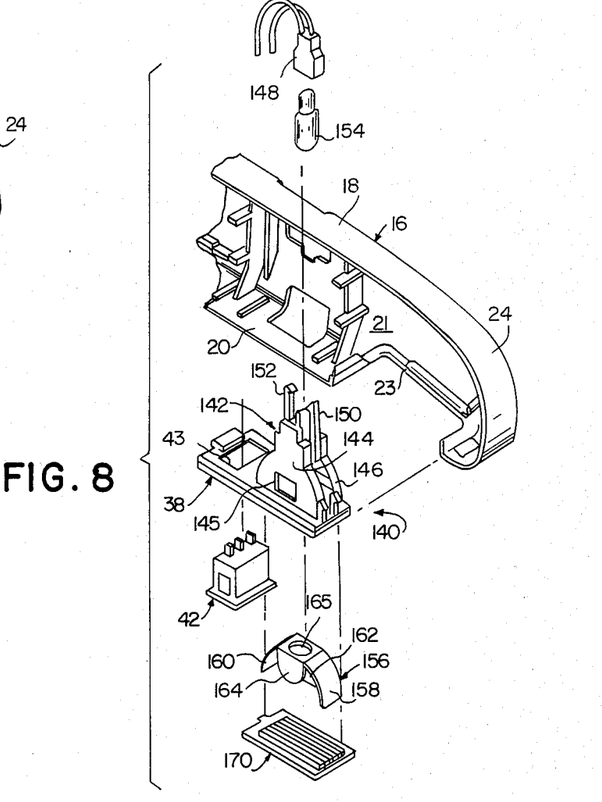
FIG. 8 is an exploded, fragmentary, perspective view of the mirror case of the rearview mirror assembly of FIGS. 1-4 illustrating the carrier module and reading, courtesy/map light assembly therein.
Figure 9:
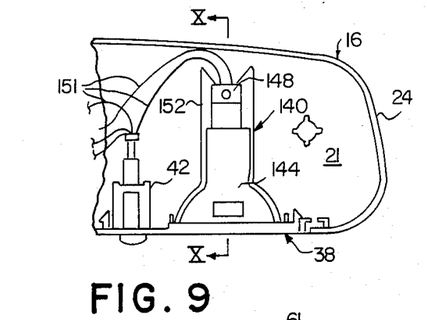
FIG. 9 is a fragmentary elevation of the carrier module, light housing assembly and control switch mounted in the rearview mirror case.

Referring now to FIGS. 8-10, the light assembly 140 for illuminating the courtesy/map light activation symbols 14 and providing courtesy/map lighting in the vehicle interior will be understood. Light assembly 140, as described in U.S. Pat. No. 4,733,336, incorporated above, is integrally molded with carrier module 38 which is adapted to be releasably retained within recess 23 in bottom wall 20 of case 16 as shown in FIG. 8. An identical light assembly 140 is included on carrier 40. Assembly 140 includes an upstanding light support housing 142 supported between back wall 21 and mirror element 11 but out of contact with the mirror element and has front wall 144 and rear wall 146. A bulb holder 148 is releasably held by upstanding resilient posts 150, 152 over the hollow interior between walls 144, 146. An incandescent light bulb 154 is mounted in holder 148 and projects into a formed, elliptical, metallic reflector 156. Reflector 156 includes sidewalls 158, 160, rear wall 162 and a partial front wall 164. These reflector walls shield the surrounding molded resinous light support walls 144, 146 from the heat of the incandescent bulb 154 and also reflect light downwardly through lens 170 which is releasably retained in the bottom opening of carrier module 38 as shown in FIGS. 8 and 10. As shown in FIGS. 8 and 9, toggle switch 42 is mounted in a second downwardly facing aperture 43 in carrier module 38 adjacent light assembly 140. Appropriate electrical wiring 151 connects bulb holder 148 with switch 42 and to a power source (not shown) in the vehicle to allow switching and activation of the incandescent light bulb 154. Accordingly, when switched on, bulb 154 provides light shining downwardly and outwardly of the case assembly through lens 170 to provide interior courtesy or map lighting for use by passengers within the vehicle compartment of the vehicle.

Light assembly 140 also provides illumination for symbols 14. Preferably, symbols 14 are formed in the same fashion as indicia 12a–12d using a programmable YAG laser marking apparatus such that symbols 14 also are formed by narrow deletion lines having a preferred width less than or equal to 0.005 inches. In order to provide light from bulb 154 in the forward direction for illuminating symbols 14, each of the front walls 144 in the light assemblies 142 on carrier modules 38, 40 includes a rectangular opening 145. This opening could have other shapes depending on the shape and size of the deletion area being illuminated. Light from bulb 154 is reflected by reflector 156 outwardly through aperture 145 in front wall 144 to the deletion area formed by narrow deletion lines in the shape of symbol 14. Accordingly, when switched on with switch 42, bulb 154 provides light simultaneously downwardly and outwardly of the ends of the assembly 10 through lens 170 for interior lighting within the vehicle as well as forwardly through aperture 145. The forwardly directed light is visible through the deletion lines forming symbol 14 by the driver or viewer of the mirror which indicates that light 154 is on. As noted above, since bottom wall 20 slopes upwardly away from the driver or viewer, carrier modules 38, 40 and any light directed through lenses 170 is not visible to the driver or other vehicle passenger in the ordinary position of the mirror assembly. As such, switches 42, 44 could be left in the on position during the day without being noticed by the vehicle occupants except for the warning provided by illumination of symbols 14.

As will be seen in FIG. 10, should the normal white light be undesirable for illuminating symbol 14, a light filter 180 formed from thin polyethylene sheet material such as that used for light filter 110 may be adhered to front wall 144 over aperture 145 to absorb the appropriate light wavelengths and provide the desired color visible through the deletion lines in symbol 14. Also, should a symbol, word or other indicia larger than the size of aperture 145 be desired, a light diffuser 185 may be mounted between aperture 145 and the deletion area 14 to spread the light from bulb 154 and aperture 145 evenly over the full extent of the deletion area.

Accordingly, the present invention will be understood to provide various types of information displayed on the visible front surface of the reflective mirror element of a rearview mirror in a manner by which the information is easily viewed when the backlight source is switched on but is unobtrusive and generally unnoticeable to the viewer or driver when the light source is not activated. As indicated, the information display can be incorporated in rearview mirror assemblies having lights or other instruments or controls therein without requiring extensive modification of the existing mirror case all while retaining unobstructed rear vision in the rearview mirror.

Of course, other types of reflective mirror elements including first surface reflective coatings or even thin metallic reflective elements in which the deletion lines are provided by openings directly through the metal could be used along with various types of rearview mirror supports and mirror cases without deviating from the scope of this invention.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. An improved rearview mirror assembly for vehicles of the type including a mirror element having a reflective surface thereon and information means for providing information to a viewer of the mirror; the improvement comprising:

said information means including a narrow deletion area in said reflective surface in which said reflective surface is removed to form an opening of predetermined shape such as a symbol, word or other indicia in said reflective surface; and light source means for illuminating said deletion area when lit/activated, said light source means positioned behind said reflective surface on the side of said mirror element opposite that from which said mirror element will be viewed in a vehicle;

said deletion area including at least one deletion line having a width which is sufficiently narrow to provide minimal contrast between the reflective surface and said line and thus be generally unnoticeable to the unaided eye of the viewer of the mirror element when viewing a rear vision image reflected by said reflective surface and said light source means is unlit/unactivated, but providing highly distinct, clear and precise lighted indicia visible to the mirror viewer when said light source means is lit/activated.

2. The improved rearview mirror assembly of claim 1 wherein said deletion line has a width of less than or equal to 0.005 inches.

3. The improved rearview mirror assembly of claim 1 wherein said mirror element is a substantially transparent substrate having a first surface adapted to face the interior of a vehicle and a second surface on the side of said element opposite said first surface; said second surface including a reflective coating thereon; said deletion line being a narrow line in said reflective coating.

4. The improved rearview mirror of claim 3 wherein said deletion area includes a plurality of ultra-narrow deletion lines in said reflective coating, said lines forming at least one symbol, word or other indicia.

5. The improved rearview mirror of claim 4 including at least one additional deletion area which includes a plurality of ultra-narrow deletion lines forming a symbol, word or other indicia in said reflective coating.

6. The improved rearview mirror assembly of claim 5 wherein said deletion and additional deletion areas are arranged in a group adjacent and near one another in an area of said reflective coating adjacent an edge of said mirror element whereby any interference with rear vision images in said mirror by said deletion and additional deletion areas is minimal.

7. The improved rearview mirror assembly of claim 6 wherein said deletion and additional deletion areas include separate warning symbols for different vehicle functions and components such as seat belt fastening, engine oil level and engine coolant temperature.

8. The improved rearview mirror assembly of claim 1 wherein said light source means includes means for illuminating other parts of said vehicle in addition to said deletion area.

9. The improved rearview mirror assembly of claim 1 wherein said light source means include a light source and means on said reflective surface for mounting said light source in alignment with said deletion area.

10. The improved rearview mirror assembly of claim 9 wherein said light source is a light emitting diode; said means for mounting said light source including a housing having a receptacle receiving said diode.

11. An improved rearview mirror assembly for vehicles of the type including a mirror element having a reflective surface thereon and information means for providing information to a viewer of the mirror; the improvement comprising:

said information means including a narrow deletion area in said reflective surface in which said reflective surface is removed to form an opening of predetermined shape such as a symbol, word or other indicia in said reflective surface; and light source means for illuminating said deletion area when lit/activated, said light source means positioned behind said reflective surface on the side of said mirror element opposite that from which said mirror element will be viewed in a vehicle and including a light for providing interior lighting within said vehicle; said deletion area defining a symbol, word or other indicia indicating activating of said light;

said deletion area being sufficiently narrow as to be generally unnoticeable to the unaided eye of the viewer of the mirror element when viewing a rear vision image reflected by said reflective surface and said light source means is unlit/unactivated, but providing highly distinct, clear and precise lighted indicia visible to the mirror viewer when said light source means is lit/activated.

12. The improved rearview mirror assembly of claim 11 wherein said light is mounted in a light holder behind said mirror element in a mirror case supporting said mirror element, said case including a first light aperture opening downwardly from said case, said light providing light downwardly of said case through said aperture when activated.

13. The improved rearview mirror assembly of claim 12 wherein said light holder also includes a second light aperture aligned with said symbol, word or other indicia such that said light provides said light source means and illuminates said symbol, word or other indicia through said second light aperture when activated while simultaneously providing light downwardly of said assembly through said first light aperture.

14. An improved rearview mirror assembly for vehicles of the type including a mirror element having a reflective surface thereon and information means for providing information to a viewer of the mirror; the improvement comprising:

said information means including a narrow deletion area in said reflective surface in which said reflective surface is removed to form an opening of predetermined shape such as a symbol, word or other indicia in said reflective surface; and light source means for illuminating said deletion area when lit/activated, said light source means positioned behind said reflective surface on the side of said mirror element opposite that from which said mirror element will be viewed in a vehicle; said light source means including a light source and means on said reflective surface for mounting said light source in a alignment with said deletion area, said light source including a light emitting diode, said means for mounting said light source including a housing having a receptacle receiving said diode and a spacer adhered to said reflective surface over said deletion area, said spacer having an aperture extending therethrough allowing light from said light emitting diode to pass through said spacer to said deletion area while shielding said light from the remainder of said assembly; said housing being adhered to the rear surface of said spacer;

said deletion area being sufficiently narrow as to be generally unnoticeable to the unaided eye of the viewer of the mirror element when viewing a rear vision image reflected by said reflective surface and said light source means is unlit/unactivated, but providing highly distinct, clear and precise lighted indicia visible to the mirror viewer when said light source means is lit/activated.

15. The improved rearview mirror assembly of claim 14 wherein said mirror element is a prism and includes a front surface and a rear surface extending at an angle to said front surface; said spacer having front and back surfaces also extending at a predetermined angle such that said housing is supported generally parallel to said front surface of said mirror element.

16. The improved rearview mirror assembly of claim 14 including a thin sheet of light filtering material positioned intermediate said deletion area and said spacer.

17. The improved rearview mirror assembly of claim 16 including a sheet of double sided adhesive material for adhering said filtering material over said deletion area, said adhesive material also helping to seal off any portions of said reflective layer at said deletion area from the atmosphere.

18. The improved rearview mirror assembly of claim 14 including an additional deletion area; said housing including an additional light emitting diode for said additional deletion area; said spacer including an additional aperture therethrough for said additional diode.

19. An improved rearview mirror assembly for vehicles of the type including a mirror element having a reflective surface thereon and information means for providing information to a viewer of the mirror; the improvement comprising:

said information means including a narrow deletion area in said reflective surface in which said reflective surface is removed to form an opening of predetermined shape such as a symbol, word or other indicia in said reflective surface;

light source means for illuminating said deletion area with lit/activated, said light source means positioned behind said reflective surface on the side of said mirror element opposite that from which said mirror element will be viewed in a vehicle; and light filtering means positioned between said deletion area and said light source means for filtering the light from said light source means which is visible at said deletion area;

said deletion area including at least one deletion line having a width which is sufficiently narrow to provide minimal contrast between the reflective surface and said line and thus be generally unnoticeable to the unaided eyes of the viewer of the mirror element when viewing a rear vision image reflected by said reflective surface and said light source means is unlit/unactivated, but providing a highly distinct, clear and precise lighted indicia visible to the mirror viewer when said light source means is lit/activated.

20. The improved rearview mirror assembly of claim 19 wherein said light filtering means includes absorbing means for absorbing light of predetermined wavelength such that light of predetermined color is visible at said deletion area.

21. An improved rearview mirror assembly for vehicles of the type including a mirror element having a reflective surface thereon and information means for providing information to a viewer of the mirror; the improvement comprising:

said information means including a narrow deletion area in said reflective surface in which said reflective surface is removed to form an opening of predetermined shape such as a symbol, word or other indicia in said reflective surface; and light source means for illuminating said deletion area when lit/activated, said light source means positioned behind said reflective surface on the side of said mirror element opposite that from which said mirror element will be viewed in a vehicle;

light filtering means positioned between said deletion area and said light source means for filtering the light from said light source means which is visible at said deletion area;

said deletion area being sufficiently narrow as to be generally unnoticeable to the unaided eyes of the viewer of the mirror element when viewing a rear vision image reflected by said reflective surface and said light source means is unlit/unactivated, but providing a highly distinct, clear and precise lighted indicia visible to the mirror viewer when said light source means is lit/activated;

said light filtering means including absorbing means for absorbing light of predetermined wavelength such that light of predetermined color is visible at said deletion area;

at least one additional deletion area defining a separate information symbol, word or other indicia; said absorbing means including transparent areas of at least two different colors whereby said information symbols words, or other indicia of said deletion and additional deletion areas are visible in different colors.

22. The improved rearview mirror assembly of claim 21 wherein said absorbing means includes a thin transparent sheet of material imprinted with at least two separate areas of colored, transparent ink.

23. The improved rearview mirror assembly of claim 21 wherein said light source means includes at least two separate light emitting diodes, each diode positioned in alignment with one of said information symbols, words or other indicia.

24. A rearview mirror assembly for vehicles comprising:

a mirror element having a reflective surface thereon;
a mirror case for supporting said mirror element therein, said case having back, top, bottom and end walls defining an opening in which said mirror element is mounted, said case including an interior space between said mirror element and said back wall;

a narrow deletion area in said reflective surface in which said reflective surface is removed to form an opening of predetermined shape such as a symbol, word or other indicia in said reflective surface;

light source means for illuminating said deletion area when lit/activated, said light source means positioned in said interior space;

said deletion area including at least one deletion line having a width which is sufficiently narrow to provide minimal contrast between the reflective surface and said line and thus be generally unnoticeable to the unaided eye of the viewer of the mirror element when viewing a rear vision image reflected by said reflective surface and said light source means is unlit/unactivated, but providing a highly distinct, clear and precise lighted indicia visible to the mirror viewer when said light source means is lit/activated.

25. The rearview mirror assembly of claim 24 wherein said mirror element is a substantially transparent substrate having a first surface adapted to face the interior of a vehicle and a second surface on the side of said element opposite said first surface; said second surface including a reflective coating thereon and forming said reflective surface; said deletion line being a narrow line in said reflective coating.

26. The rearview mirror of claim 25 wherein said deletion area includes a plurality of ultra-narrow deletion lines in said reflective coating, said lines forming at least one symbol, word or other indicia.

27. The improved rearview mirror assembly of claim 26 including an additional one of said deletion areas including additional ones of said ultra-narrow deletion lines forming a symbol, word or other indicia, said deletion and additional deletion areas arranged in a group adjacent and near one another in an area of said reflective coating adjacent an edge of said mirror element whereby any interference with rear vision images in said mirror by said deletion areas will be minimal.

28. The rearview mirror assembly of claim 27 wherein each of said deletion lines is formed with a laser marking apparatus and has a width of less than or equal to 0.005 inches.

29. The rearview mirror assembly of claim 27 wherein said deletion and additional deletion areas include separate warning symbols for different vehicle functions and components such as seat belts fastening, engine oil level, fuel level and engine coolant temperature.

30. The rearview mirror assembly of claim 24 wherein said light source means includes means for illuminating other parts of said vehicle in addition to said deletion area.

31. The rearview mirror assembly of claim 24 wherein said light source means include a light source and means on said reflective surface for mounting said light source in alignment with said deletion area.

32. The rearview mirror assembly of claim 31 wherein said light source is a light emitting diode; said means for mounting said light source including a housing having a receptacle receiving said diode.

33. A rearview mirror assembly for vehicles comprising:

a mirror element having a reflective surface thereon;
a mirror case for supporting said mirror element therein, said case having back, top, bottom and end walls defining an opening in which said mirror element is mounted, said case including an interior space between said mirror element and said back wall;

a narrow deletion area in said reflective surface in which said reflective surface is removed to form an opening of predetermined shape such as a symbol, word or other indicia in said reflective surface;

light source means for illuminating said deletion area when lit/activated, said light source means positioned in said interior space and including a light for providing interior lighting within said vehicle; said deletion area defining a symbol, word or other indicia indicating activation of said light;

said deletion area being sufficiently narrow as to be generally unnoticeable to the unaided eye of the viewer of the mirror element when viewing a rear vision image reflected by said reflective surface and said light source means is unlit/unactivated, but providing a highly distinct, clear and precise lighted indicia visible to the mirror viewer when said light source means is lit/activated.

34. The rearview mirror assembly of claim 33 wherein said light is mounted in a light holder behind said mirror element in said mirror case supporting said mirror element, said case including a first light aperture opening downwardly from said case, said light providing light downwardly of said case through said aperture when activated.

35. The rearview mirror assembly of claim 34 wherein said light holder also includes a second light aperture aligned with said symbol, word or other indicia such that said light provides said light source means and illuminates said symbol, word or other indicia through said second light aperture when activated while simultaneously providing light downwardly of said assembly through said first light aperture.

36. A rearview mirror assembly for vehicles comprising:

a mirror element having a reflective surface thereon;

a mirror case for supporting said mirror element therein, said case having back, top, bottom and end walls defining an opening in which said mirror element is mounted, said case including an interior space between said mirror element and said back wall;

a narrow deletion area in said reflective surface in which said reflective surface is removed to form an opening of predetermined shape such as a symbol, word or other indicia in said reflective surface;

light source means for illuminating said deletion area when lit/activated, said light source means positioned in said interior space and including a light source and means on said reflective surface for mounting said light source in alignment with said deletion area, said light source including a light emitting diode; said means for mounting said light source including a housing having a receptacle receiving said diode and a spacer adhered to said reflective surface over said deletion area, said spacer having an aperture extending therethrough allowing light from said light emitting diode to pass through said spacer to said deletion area while shielding said light from the remainder of said assembly; said housing being adhered to the rear surface of said spacer;

said deletion area being sufficiently narrow as to be generally unnoticeable to the unaided eye of the viewer of the mirror element when viewing a rear vision image reflected by said reflective surface and said light source means is unlit/unactivated, but providing a highly distinct, clear and precise lighted indicia visible to the mirror viewer when said light source means is lit/activated.

37. The rearview mirror assembly of claim 36 wherein said mirror element is a prism and includes a front surface and a rear surface extending at an angle to said front surface; said spacer having front and back surfaces also extending at a predetermined angle such that said housing is supported generally parallel to said front surface of said mirror element; said case including actuator means for pivoting said case and prism mirror element between a full reflectivity day position and a reduced reflectivity night position.

* * * * *

UNITED STATES PATENT AND TRADEMARK OFFICE
CERTIFICATE OF CORRECTION

PATENT NO. : 4,882,565

DATED : November 21, 1989

INVENTOR(S) : William W. Gallmeyer

It is certified that error appears in the above-identified patent and that said Letters Patent is hereby corrected as shown below:

Column 11, claim 7, line 2:

After "level" insert --, fuel level--.

Column 12, claim 19, line 57:

"with" should be --when--.

Column 14, claim 27, line 31:

Delete "improved".

Column 14, claim 29, line 47:

"belts" should be --belt--.

Signed and Sealed this

Fifteenth Day of October, 1991

*Attest:*

HARRY F. MANBECK, JR.

*Attesting Officer*     *Commissioner of Patents and Trademarks*